United States Patent [19]

Rossouw et al.

[11] Patent Number: 5,166,012

[45] Date of Patent: Nov. 24, 1992

[54] MANGANESE OXIDE COMPOUNDS

[75] Inventors: Margaretha H. Rossouw; Michael M. Thackeray, both of Pretoria, South Africa

[73] Assignee: Technology Finance Corporation (Proprietary) Limited, Sandton, South Africa

[21] Appl. No.: 694,787

[22] Filed: May 2, 1991

[30] Foreign Application Priority Data

May 17, 1990 [ZA] South Africa .................. 90/3797
Feb. 19, 1991 [ZA] South Africa .................. 91/1225

[51] Int. Cl.$^5$ ............................ H01M 41.50; C01G 45/12
[52] U.S. Cl. .......................................... 429/224; 423/599
[58] Field of Search ............... 429/224; 423/599, 605

[56] References Cited

U.S. PATENT DOCUMENTS

| | | | |
|---|---|---|---|
| 2,885,262 | 5/1959 | Fleischer et al. | 423/605 X |
| 3,320,157 | 5/1967 | Arey et al. | 423/605 X |
| 4,758,484 | 7/1988 | Furukawa et al. | 429/224 X |
| 4,959,282 | 9/1990 | Dahn et al. | 423/605 X |
| 4,975,346 | 12/1990 | Lecerf et al. | |

FOREIGN PATENT DOCUMENTS

| | | |
|---|---|---|
| 279235 | 8/1988 | European Pat. Off. |
| 2656957 | 7/1991 | France . |
| 2221213A | 1/1990 | United Kingdom . |
| 2234233 | 1/1991 | United Kingdom . |

OTHER PUBLICATIONS

Volnov *Electrochimica Acta* vol. 27, No. 7, "MnO$_2$-Structure and Activity", pp. 833-835, Jul. 1982.

Nohma, *Journal of Power Sources* vol. 26, No. 3/4 "Manganse Oxides for a Lithium Secondary Battery-Composite Dimensional Manganese Oxide (CDMO)", pp. 389-396, May 1989.

Ohzuku, T., et al., J. Electrochem. Soc., 138: 360-265 (Feb., 1991).

Parant, J.-P., et al., J. Solid State Chem., 3:1-11 (1971).

Parida, K. M. et al., Electrochimica Acta, 26:435-443 (1981).

Wells, A. F., Structural Inorganic Chemistry, 4th ed., Clarendon Press, Oxford, 1975, pp. 459-460.

*Primary Examiner*—Stephen Kalafut
*Attorney, Agent, or Firm*—St. Onge Steward Johnston & Reens

[57] ABSTRACT

The invention provides a hydrogen manganese oxide compound. It has manganese cations and oxygen anions arranged in a framework having a hollandite-type structure and defining channels. Cations in the channels are confined to manganse, hydrogen and/or lithium cations. The ionic ratios of lithium:manganese cations and of hydrogen:manganese cations are respectively at most 0.05:1 and at least 0.01:1.00. The invention also provides a method of making said compound; a lithium manganese oxide compound derived from said hydrogen manganese oxide compound and a method of synthesising it therefrom; and electrochemical cells employing said hydrogen manganese oxide and lithium manganese oxide compounds as active cathode materials.

16 Claims, 12 Drawing Sheets

MANGANESE OXIDE COMPOUNDS

THIS INVENTION relates to a manganese oxide compound; to an electrochemical cell employing such compound as its cathode; to a method of making said compound; to a lithium manganese oxide compound derived from said manganese oxide compound; and to an electrochemical cell employing the lithium manganese oxide compound as its cathode.

According to one aspect of the invention there is provided a hydrogen manganese oxide compound in which there are manganese cations and oxygen anions arranged in a framework having a hollandite-type structure defining channels, any metal cations in the channels other than manganese cations being lithium cations, the ionic ratio of lithium cations:manganese cations being at most 0.05:1.00, and the ionic ratio of hydrogen cations:manganese cations being at least 0.01:1.00.

In this compound the average valency of the Mn cations is between +3.5 and +4, typically +3.9 to +4.00, and the compound has a lattice structure which can act as a host structure which provides channels which can receive guest cations such as Li, H, Zn, $NH_4$ and K cations.

The hollandite-type structure has a tetragonal unit cell with lattice constants of:
a = approximately 9.78 Å; and
c = approximately 2.85 Å
and is characterized by edge sharing $MnO_6$ octahedra forming double chains.

Preferably the ionic ratio of lithium cations:manganese cations is as low as possible, so that there are substantially no Li cations in the compound, eg a ratio of at most 0.03:1.00, more preferably at most 0.01:1.00. Accordingly, the proportion of lithium cations is too small to perform any material stabilizing function with regard to the hollandite-type structure.

Accordingly the hydrogen manganese oxide compound of the present invention can be regarded essentially as a hydrated manganese dioxide compound in which the oxygen from the $xH_2O$ in the $MnO_2 \cdot xH_2O$ set forth hereunder is at least partially incorporated into the hollandite framework structure and is not associated with surface water or water at grain boundaries. It has an $\alpha\text{-}MnO_2$ framework structure and can be expressed as $H_{2x}MnO_{2+x}$ or $MnO_2 \cdot xH_2O$ as indicated above, in which $0.005 < x \leq 0.3$. The oxygen content of said manganese oxide compound need thus not be exactly 2 oxygen ions for each manganese ion, and may range from 1.75-2.00 oxygen ions for each manganese ion, preferably 1.85-2.00 and more preferably 1.95-2.00. In other words the ionic ratio of oxygen anions:manganese cations may be 1.75:1.00–2.00:1.00, preferably 1.85:1.00–2.00:1.00 and more preferably 1.95:1.00–2.00:1.00.

Preferably, for use in aqueous cells as described hereunder, the ionic ratio of hydrogen cations:manganese cations is at least 0.10:1.00, more preferably at least 0.20:1.00. However for lithium cells, when the hydrogen manganese oxide is dehydrated as described hereunder, the hydrogen content is preferably lower, the ratio being eg at most 0.10:1.00, preferably at most 0.05:1.00.

The hydrogen manganese oxide compound described above can be used as a cathode in an electrochemical cell having an aqueous electrolyte and zinc as active cathode material. In this case the water present in the hydrogen manganese oxide compound ($MnO_2 \cdot xH_2O$) can improve electrochemical performance. Instead, it can, after dehydration by being heated to at least 80° C. to remove water, be used as a cathode in an electrochemical cell having a non-aqueous electrolyte and lithium as active anode material.

Thus, according to another aspect of the invention there is provided an electrochemical cell which comprises an anode whose active anode material is selected from the group consisting of zinc, zinc alloys, mixtures of said zinc-containing anode materials, lithium, lithium alloys, lithium-containing compounds and mixtures of said lithium-containing anode materials, a cathode and a suitable electrolyte whereby the anode is electrochemically coupled to the cathode, the cathode being a hydrogen manganese oxide compound having a hollandite-type structure of the present invention as described above.

Such cells can accordingly be represented schematically by:

Zn[anode]/electrolyte/hydrogen manganese oxide(cathode); or

Li[anode]/electrolyte/hydrogen manganese oxide(cathode).

In the case of cells with zinc-containing anodes, these cells may be primary cells or secondary (rechargeable) cells, and the anodes will be metallic zinc or an alloy thereof and the electrolyte may be any suitable aqueous electrolyte, e.g. one of those typically used in primary Leclanché cells, in $ZnCl_2$ cells, or in KOH cells, ie using $NH_4Cl$, $ZnCl_2$ or KOH aqueous electrolytes, respectively. In these cells the channels of the hollandite-type structure are accessible for the diffusion of H, $NH_4$, Zn or K cations of the electrolyte. Thus the cell may have a zinc-containing active anode material, the electrolyte being an aqueous room-temperature electrolyte selected from solutions of $NH_4Cl$, $ZnCl_2$, KOH and mixtures thereof, the cathode being one in which the ionic ratio of hydrogen cations:manganese cations is at least 0.10:1.00.

When lithium is the active anode material it is necessary for the cell to be anhydrous and in this case the hydrogen manganese oxide compound of the invention must be dried, typically by heating to a temperature of 80°–400° C., eg 300° C., at least partially to remove the water component ($xH_2O$) from the compound ($MnO_2 \cdot xH_2O$). In practice, however, this drying by heating does not entirely remove all the hydrogen from the structure, and in general, at the above temperature range of 80°–400° C., there will always be a minor residual hydrogen content in the structure. Thus the cell may have a lithium-containing active anode material, the electrolyte being a room temperature electrolyte selected from $LiClO_4$, $LiAsF_6$, $LiBF_4$ and mixtures thereof, dissolved in a suitable organic solvent, the cathode being one in which the ionic ratio of hydrogen cations:manganese cations is at most 0.10:1.00.

Instead, for use in a cell with lithium as active anode material, the hydrogen manganese oxide compound of the present invention can be converted to a lithium hydrogen manganese oxide compound, as described hereunder.

According to another aspect of the invention there is provided a method of making a hydrogen manganese oxide compound in accordance with the present invention and as described above, the method comprising treating a suitable lithium manganese oxide compound with a suitable acid at a temperature in the range 40°–100° C. to leach $Li_2O$ therefrom, to leave a residue comprising said hydrogen manganese oxide compound.

In particular, the lithium manganese oxide compound may be $Li_2MnO_3$.

Preferably the acid is a mineral acid such as $H_2SO_4$, the leaching taking place at 70°–100° C., e.g. 90° C.; and the acid may thus be $H_2SO_4$, at a concentration in the range 0.5–10 molar, a suitable example being 5 molar $H_2SO_4$.

Said preferred starting material, $Li_2MnO_3$, which may alternatively be written as $Li_2O.MnO_2$ has a structure in which the oxygen anions are cubic-close-packed (but slightly distorted from ideal packing). The cations occupy all the octahedral sites of the structure, which are located in layers between the cubic-close-packed oxygen planes. Each alternate cation layer is filled entirely with $Li+$ ions; the other layers contain $Mn^{4+}$ and $Li+$ ions in a 2:1 ratio.

This $Li_2MnO_3$ starting material may in turn be synthesized at 300°–900° C., preferably 450°–850° C., by reaction of a manganese salt, hydroxide or oxide such as $MnCO_3$, $Mn(NO_3)_2$, $Mn(OH)_2$ or $MnO_2$ with a lithium salt, hydroxide or oxide such as $Li_2CO_3$, $LiNO_3$, $LiI$, $LiOH$ or $Li_2O$. The reaction should take place with an atomic ratio of the lithium in the lithium compound to the manganese in the manganese compound of 2:1 and is effected by heating a mixture of the compounds in question in finely divided form under air or another suitable oxygen-containing oxidizing atmosphere for a sufficient period of time to form the single phase $Li_2MnO_3$ compound.

It is known in the art that, at lower temperatures such as 25° C., said acid treatment acts to leach out substantially all the lithium, as the oxide thereof, from the lithium manganese oxide starting compound, the leaching leaving a residue comprising a manganese oxide component of the starting compound, in which there is an essentially layered arrangement of the Mn ions. This can be expressed, eg for said $Li_2MnO_3$ starting compound, by the leaching out of $Li_2O$ to leave $MnO_2$ according to the reaction:

in which $0 < y \leq 2$. This leaching is accompanied by an at least partial exchange of hydrogen ions for lithium ions.

However, in contrast, when the leaching is carried out at higher temperatures in accordance with the invention, e.g. 90° C., it is believed that this layered $Li_{2-y}MnO_{3-y/2}$ intermediate structure is formed but rearranges at the leaching temperature to form the hollandite-type structure of the hydrogen manganese oxide compound of the present invention, when essentially all the lithium is removed therefrom.

During the leaching it is possible that not all the lithium ions are entirely removed from the structure, such that a negligibly small fraction (so that the Li:Mn ionic ratio is at most 0.05, eg 0.01:1.00–0.03:1.00 or less) of the Li ions remains in the structure. Furthermore, during the leaching, said H cations which are exchanged for Li cations serve to stabilize the structure, and water becomes associated with the surfaces of the manganese oxide particles and grain boundaries therebetween, the overall H cation content however being less than 1% by mass of the structure.

The Applicant believes that the hollandite-type structure of the hydrogen manganese oxide compound of the present invention is isostructural with the manganese oxide structure in the compounds $Na_2Mn_8O_{16}$, $KMn_8O_{16}$ and $NH_4Mn_8O_{16}$ in which the $Mn_8O_{16}$ is stabilized respectively by sodium, potassium and ammonium ions. Such structures are described, for example, in an article by Parant et al., *J. Solid State Chem.* Volume 3, 1–11 (1971). It will be appreciated in this regard that $MnO_2$ can be written instead as $Mn_8O_{16}$.

It is a feature of the hydrogen manganese oxide compound of the present invention that it can have an extremely low proportion of lithium cations, typically amounting to 3% of the manganese cations or less, and that it has a hollandite-type structure which is apparently stabilized by the hydrogen cations therein, without the employment of any additional stabilizing cations such as those ammonium, potassium, barium or the like. This makes the compound desirable for use as a cathode in electrochemical cells, as the absence of said stabilizing cations permits an enhanced degree of guest cation insertion, during cell discharging, into the hollandite-type structure, and, particularly for lithium-cell applications as described above, it permits extraction of guest (lithium) cations during charging, without any unacceptable destabilizing of the structure.

The reason for the high degree of beneficial stability of the hollandite structure is unknown to the Applicant, but it may arise from the fact that the hollandite-type structure is extremely well developed and very close to an ideal hollandite-type structure, the well developed structure arising from the way in which the hydrogen manganese oxide is made by leaching $Li_2O$ from $Li_2MnO_3$ with an acid.

Because of the absence of stabilizing cations other than H cations, the manganese oxide of the present invention is useful in making a lithium manganese oxide which retains said stable hollandite-type structure.

Accordingly, it can be used to synthesize a lithium manganese oxide compound in which its hydrogen cations are at least partially exchanged by lithium ions and in which the manganese and oxygen ions retain a stable hollandite-type structure, and having the general formula:

in which x is as defined above and $0 < z \leq 2x$.

The invention thus extends to a lithium manganese oxide compound of formula $H_{2x-z}Li_zMnO_{2+x}$ in which $0.005 < x \leq 0.3$ and $0 < z < 2x$, and there are manganese cations and oxygen anions arranged in a stable hollandite-type structure having channels containing no cations other than lithium cations, hydrogen cations and manganese cations.

The invention also provides a method of synthesizing a lithium manganese oxide of formula $H_{2x-z}Li_zMnO_{2+x}$ as described above, which method comprises reacting the hydrogen manganese oxide compound of the present invention as described above with a suitable lithium compound, in an oxygen-containing atmosphere at a temperature of 250°–400° C., until the lithium compound has essentially been consumed by the heating and by reaction thereof with said hydrogen manganese oxide compound.

The method will usually be used to make a lithium manganese oxide compound which is a lithium hydrogen oxide compound in which $z<2x$.

The atmosphere may be oxygen or air.

If necessary, any unreacted said lithium compound may, after said reaction, be washed from the reaction product by means of water, the reaction product then being again heated to above 100° C., eg 250°-400° C., to dry the product and to ensure complete reaction of any residual said lithium compound.

In this regard, when $z=2x$ so that $H_{2x-z}Li_zMnO_{2+x}$ is $Li_{2x}MnO_{2+x}$ ($MnO_2.xLi_2O$) the hollandite structure of the manganese cations and oxygen anions, remains after the conversion to said $MnO_2.xLi_2O$, and behaves analogously to $\lambda$-$MnO_2$, which, when $Li_2O$ is incorporated therein in similar fashion by reaction at elevated temperature, similarly retains the spinel-type arrangement of its manganese and oxygen ions.

The method of making said lithium manganese oxide compound accordingly amounts to dehydrating the hydrogen manganese oxide starting material and heating to 250°-400° C. in the presence of said suitable lithium compound.

Suitable lithium compounds are those which, when heated in to 300°-400° C., give $Li_2O$, and include lithium oxides, hydroxides and salts such as nitrates and carbonates. The reaction involves mixing the hydrogen manganese oxide in finely divided form ($<200$ $\mu$m and preferably $<50$ $\mu$m particle size) with the lithium compound which may be in a similarly finely divided solid form, or may be wet mixed eg in water, ethanol or hexane with the hydrogen manganese oxide as a slurry and dried before or during the heating to 250°-400° C.

The invention also extends to hydrogen lithium manganese oxide compound and to a lithium manganese oxide compound whenever made in accordance with the respective methods as described above, and to electrochemical cells in which said lithium manganese oxide compound is the cathode.

These electrochemical cells may be cells having lithium as active anode material, with a suitable non-aqueous electrolyte.

Discharging of the cell will involve an insertion of Li into the lithium manganese oxide, with charging involving an extraction of Li from the manganese oxide. The electrolyte is conveniently a room-temperature electrolyte selected from $LiClO_4$, $LiAsF_6$, $LiBF_4$ and mixtures thereof, dissolved in a suitable organic solvent such as propylene carbonate, dimethoxyethane or mixtures thereof. Apart from lithium itself, suitable lithium-containing alloys which can be used for the anode include lithium/aluminium alloys and lithium/silicon alloys in the usual ratios employed in the art. Instead lithium/carbon anodes such as lithium/carbon intercalation compounds may be used.

It is believed that both the hydrogen manganese oxide cathodes and the lithium manganese oxide cathodes will act essentially as one-dimensional cathodes in the channels of the hollandite lattice structure defined between the chains of edge-sharing $MnO_6$ octahedra. In the cathodes during discharge Li ions from the anode pass through the electrolyte and diffuse into said channels to provide a lithium-intercalated discharged cathode, the reverse taking place during charging.

The invention will now be described, by way of non-limiting illustrative example, with reference to certain experiments which the Applicant has carried out, and with reference to the accompanying drawings in which.

EXAMPLE 1

Electrolytically prepared $\gamma$-$MnO_2$ was reacted with LiOH in a 2:1 atomic ratio of the lithium in the LiOH to the manganese in the $\gamma$-$MnO_2$ at a temperature initially set at 650° C. for 4 hours and finally at 850° C. for 16 hours, after initially mixing the LiOH and $\gamma$-$MnO_2$ until substantially homogenous with a ball mill to form a powder of $<200$ $\mu$m particle size, predominantly $<50$ $\mu$m, to obtain an $Li_2MnO_3$ compound.

The resulting $Li_2MnO_3$ was leached with 5 molar $H_2SO_4$ at 90° C. for 48 hrs to obtain a sample of hydrogen manganese oxide according to the present invention and having a hollandite-type structure. Chemical analysis of the oxide indicated that essentially all the lithium had been extracted by the leaching, to leave a negligible small amount of lithium, corresponding to a lithium:manganese ion ratio of 0.027:1.00. The hydrogen content of this sample was 0.65% by mass after it had been dried at about 90° C. for 24 hours.

Figure 1:
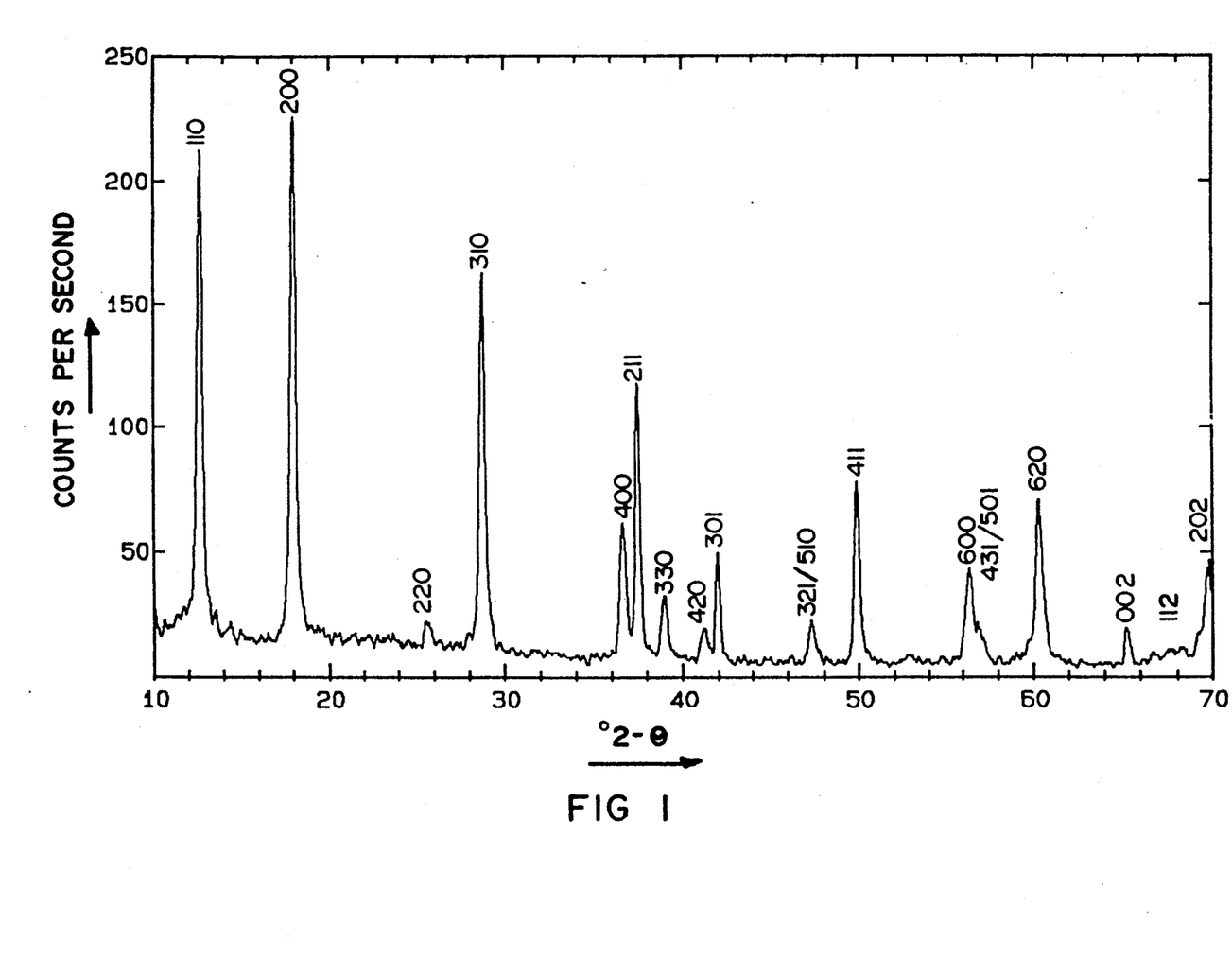
FIG. 1 shows a powder X-ray diffraction pattern of a sample of hydrogen manganese oxide of the present invention (for the 2$\Theta$ range 10°-70° and using CuK$_\alpha$ radiation)

An X-ray diffraction pattern was prepared therefrom and is shown in FIG. 1, which confirms the existence of the hollandite-type structure. Crystallographic data for this structure are given in the following Table, wherein they are compared with similar data for a reference $\alpha$-$MnO_2$ ($KMn_8O_{16}$-JCPDS 29-1020) stabilized by potassium ions.

TABLE

| Invention | | | Reference | | |
|---|---|---|---|---|---|
| h k l | d (Å) | Intensity (cps) | h k l | d (Å) | Intensity (cps) |
| 110 | 6.913 | 99 | 110 | 6.940 | 26 |
| 200 | 4.889 | 92 | 200 | 4.908 | 32 |
| 220 | 3.457 | 3 | 220 | 3.470 | 11 |
| 310 | 3.092 | 100 | 310 | 3.104 | 68 |
| 101 | 2.739 | 5 | 101 | 2.734 | 1 |
| 400 | 2.444 | 40 | 400 | 2.454 | 7 |
| 211 | 2.389 | 61 | 211 | 2.389 | 100 |
| 330 | 2.304 | 20 | 330 | 2.313 | 3 |
| 420 | 2.186 | 13 | 420 | 2.195 | 7 |
| 301 | 2.147 | 24 | 301 | 2.148 | 18 |
| 321 | 1.9655 | 6 | | | |
| 510 | 1.9174 | 19 | 510 | 1.9249 | 4 |
| 411 | 1.8236 | 51 | 411 | 1.8262 | 12 |
| 440 | 1.7284 | 6 | 440 | 1.7351 | 1 |
| 530 | 1.6767 | <1 | 530 | 1.6833 | 2 |
| 600 | 1.6295 | 36 | 600 | 1.6358 | 12 |
| 431, 501 | 1.6129 | 36 | 431 | 1.6161 | 5 |
| 620 | 1.5459 | 4 | 620 | 1.5519 | 1 |
| 521 | 1.5317 | 60 | 521 | 1.5350 | 9 |
| 002 | 1.4265 | 12 | 002 | 1.4235 | 5 |
| 611 | 1.4004 | 3 | 611 | 1.4038 | 1 |
| 112 | 1.3971 | 3 | | | |
| 550, 710 | 1.3827 | 8 | 550 | 1.3881 | 1 |
| 202 | 1.3694 | 6 | 202 | 1.3671 | 1 |

Both the hydrogen manganese oxide of the invention and the reference $\alpha$-$MnO_2$ have a tetragonal unit cell, and they both have the space group I4/m. In the unit cell of the hydrogen manganese oxide of the invention $a=b=9.780$ Å and $c=2.853$ Å; and in that of the reference $\alpha$-$MnO_2$ $a=b=9.815$ Å and $c=2.847$ Å. A neuron diffraction study of the hydrogen manganese oxide of the invention indicated that it is of formula $H_{0.4}Mn_{0.9}O_2$ in which the manganese cations partially occupy the octahedral sites of the hollandite structure. The exact positions of the hydrogen ions in the channels of the structure could, however, not be positively identified.

EXAMPLE 2

Figure 2:
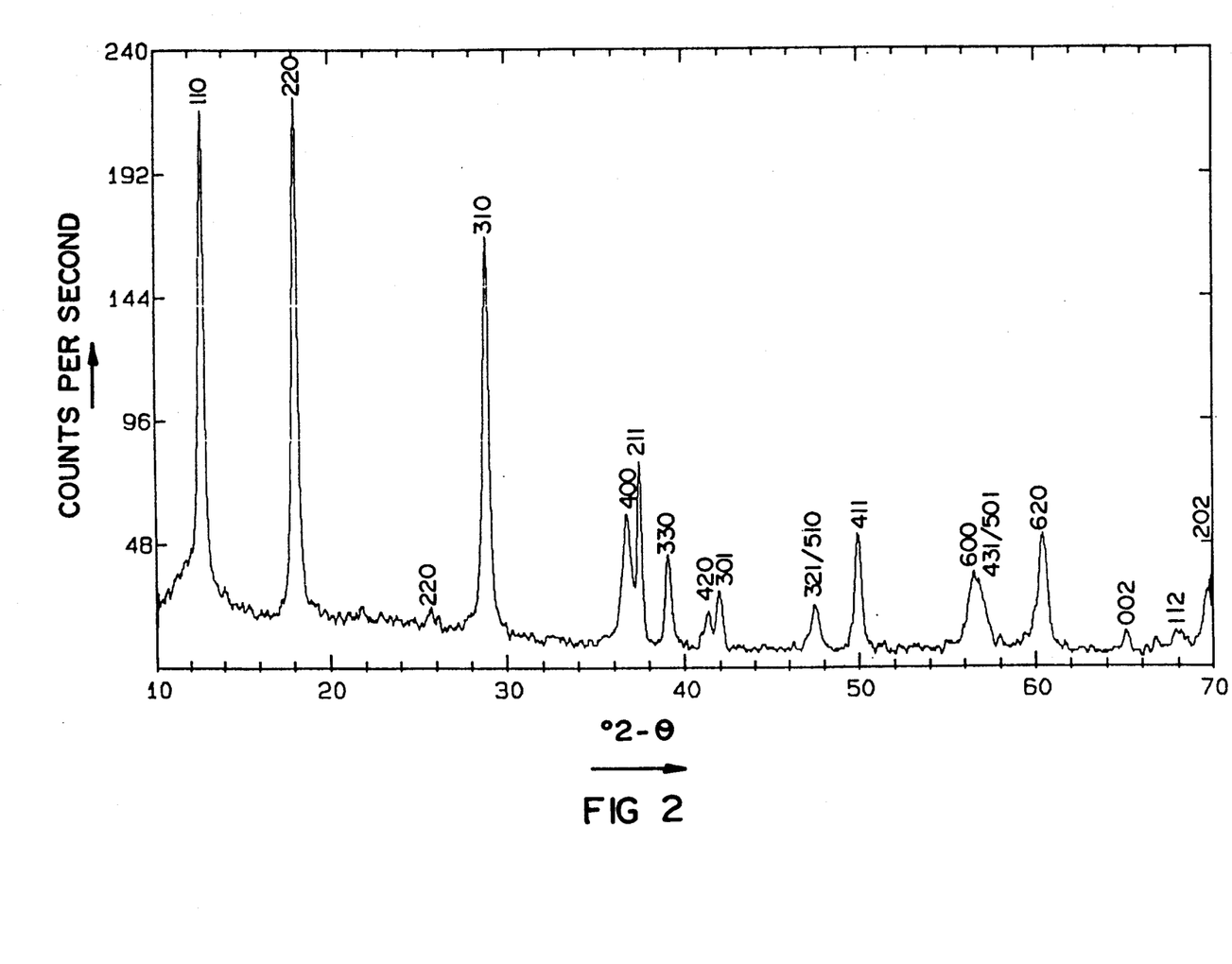
FIG. 2 shows a similar pattern for the sample whose pattern is shown in FIG. 1, after heating in air at 300° C.

The hydrogen manganese oxide product prepared in Example 1 was heated for 24 hrs at 300° C. in air. Its X-ray diffraction pattern after such heating shown in FIG. 2, which shows that the hollandite-type structure remained stable after such heating. The hydrogen content of this sample was found to be 0.03% by mass. This compound thus has a composition close to an ideal $\alpha$-$MnO_2$ stoichiometry.

EXAMPLE 3

An electrochemical cell was assembled, employing the product of Example 1, after heating to 100° C. in air to remove any surface water therefrom, as the cathode. The anode was lithium foil and 1 Molar $LiClO_4$ in dimethoxyethane:propylene carbonate in a 1:1 volumetric ratio was used as electrolyte.

Figure 3:
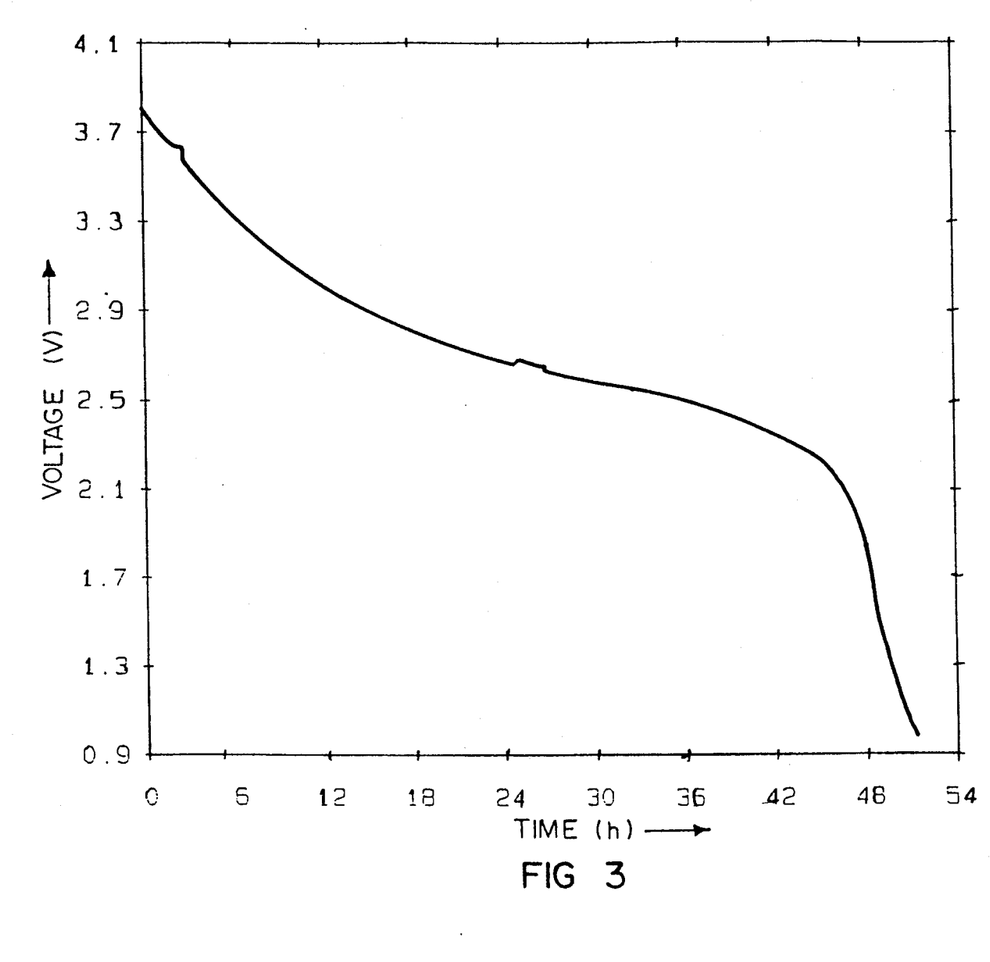
FIG. 3 shows a plot of voltage (V) against time (h) for the discharge curve of a lithium cell employing the hydrogen manganese oxide whose pattern is shown in FIG. 1, after heating of said manganese oxide to 100° C., as its cathode.
Figure 4:
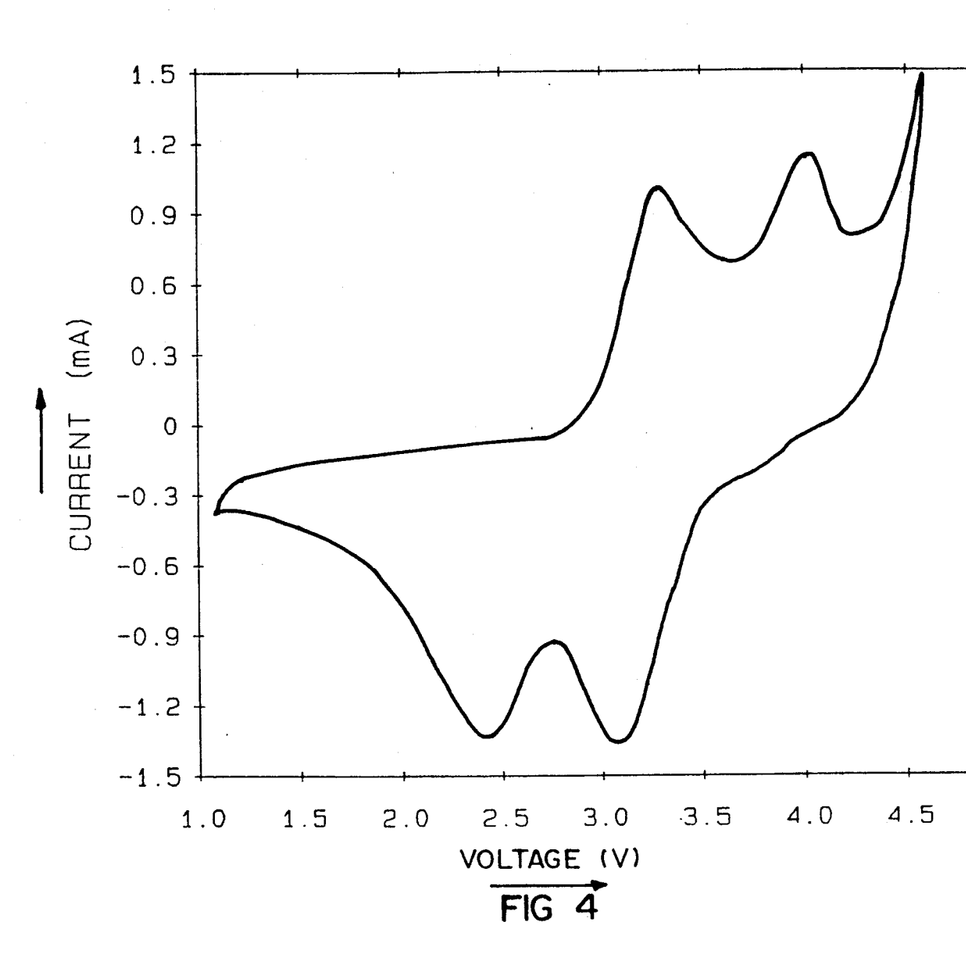
FIG. 4 shows a cyclic voltammogram plot of current (mA) against voltage (V) for the cell and cathode whose discharge curve is shown in FIG. 3.

The cell. was discharged at 20° C. at a current of 200 $\mu$A. The cell was found to have a capacity of about 210 mA-hr/g based on the mass of the active cathode material to a 2V cut off and about 230 mA-hr/g to a 1 V cut-off. The discharge curve is shown in FIG. 3 A cyclic voltammogram of a similar cell cycled between voltage limits of 4.6 V and 1.0 V is shown in FIG. 4 and demonstrates that the cell discharges in a two-stage fashion and can operate reversibly, indicating that the cathode has utility in rechargeable cells.

Figure 5:
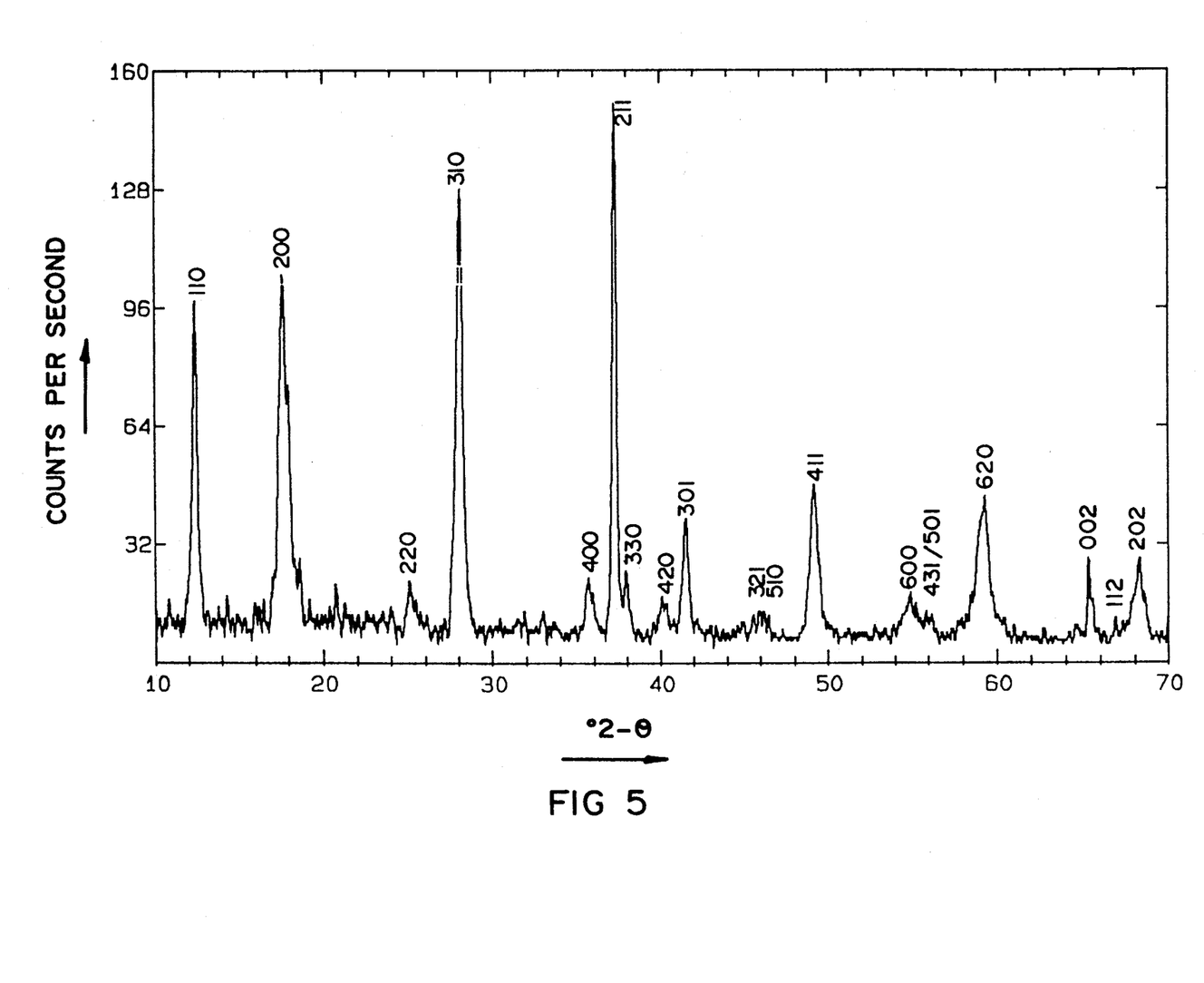
FIG. 5 shows a powder X-ray diffraction pattern of the hydrogen manganese oxide whose pattern is shown in FIG. 1, after its having been subjected to 50 discharge and 49 charge cycles in a lithium cell similar to that whose plots are shown in FIGS. 3 and 4.

The X-ray diffraction pattern of the cathode material of a similar lithium cell after having been subjected to 50 discharge and 49 charge cycles is shown in FIG. 5. It is to be noted that the X-ray pattern is similar to that of FIG. 1 which indicates that the hollandite-type structure has been retained. Furthermore, it is to be noted that the peaks have shifted to higher 2-$\Theta$ values, and that the peak intensities are slightly different from those in FIG. 1. These data indicate that lithium ions have been inserted into the hollandite-type structure during the electrochemical discharge reactions with a concomitant expansion of the hollandite-type structure. The tetragonal unit cell of the cycled cathode was determined to have lattice parameters $a=b=10.039$ Å and $c=2.854$ Å.

EXAMPLE 4

Example 3 was repeated, except that the hydrogen manganese oxide product of Example 1 was heated to 400° C. in air to dry it more thoroughly before the cell was assembled.

Figure 6:
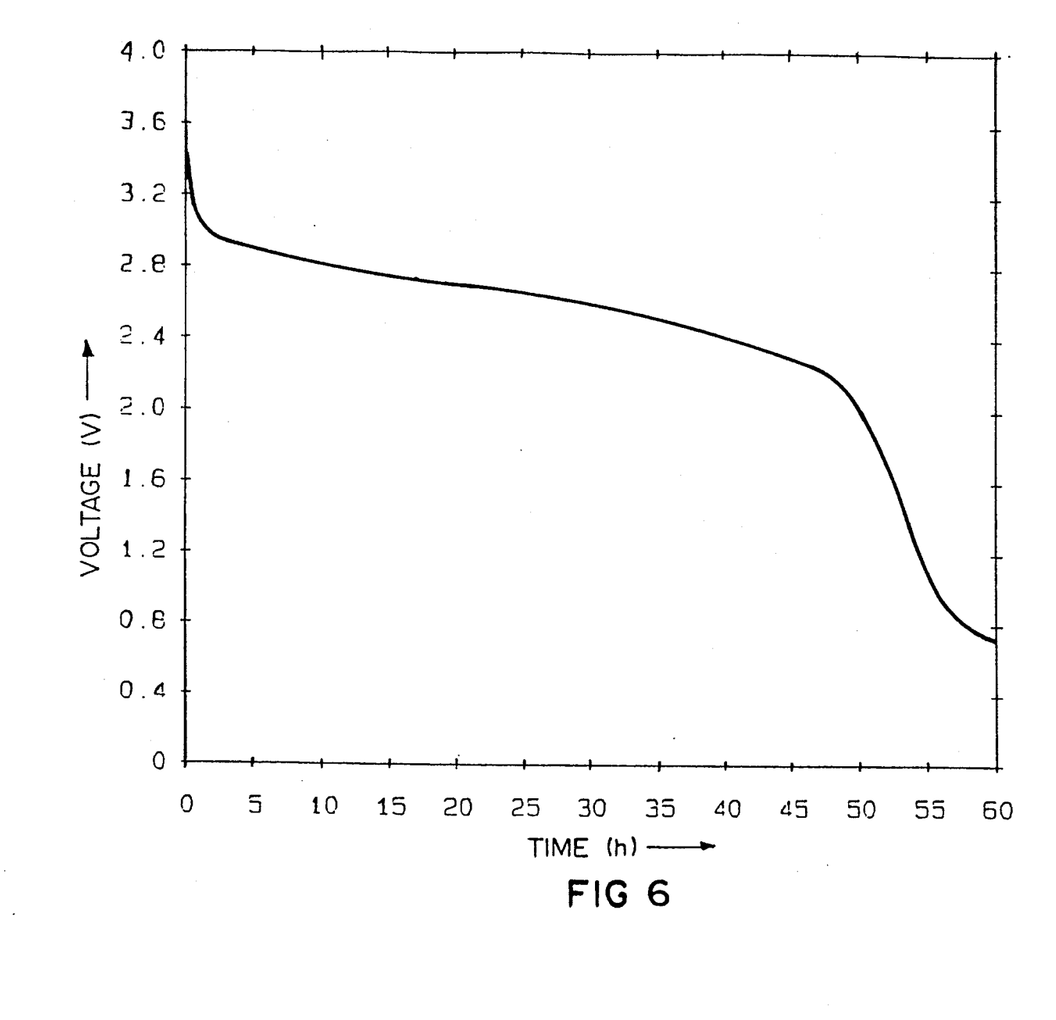
FIG. 6 shows a plot similar to FIG. 3, for the same cell as in FIG. 3 except that the hydrogen manganese oxide was heated to 400° C. instead of 100° C.

The discharge curve of this cell is shown in FIG. 6, and the cell was found to have a capacity of about 200 mA-hr/g to a cut-off of 2 V, and about 220 mA-hr/g to a cut-off of IV.

EXAMPLE 5

Figure 7:
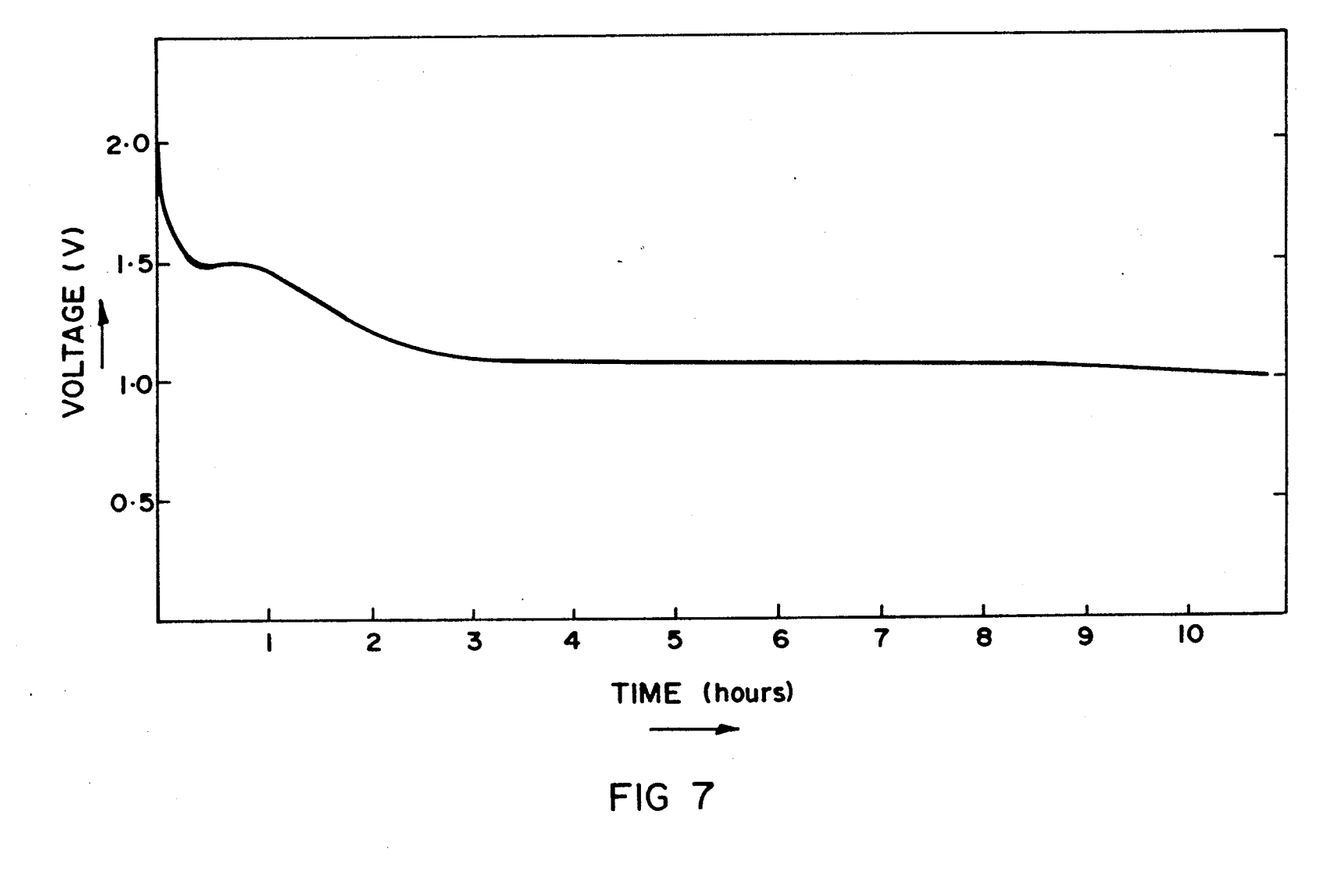
FIG. 7 shows a plot of voltage (V) against time (h) for the discharge curve of a zinc cell employing the hydrogen manganese oxide whose pattern is shown in FIG. 1.

An electrochemical cell was assembled, employing the hydrogen manganese oxide product of Example 1 as the cathode. The anode was metallic zinc amalgamated with mercury and an electrolyte was used containing $NH_4Cl$ (20.6%), $ZnCl_2$ (9.8%), $H_2O$ (67.6%) and carboxymethyl cellulose (2.0%), by mass. The cathode was composed of said manganese oxide (78.4%), carbon black (9.8%) and $NH_4Cl$ (11.8%), by mass. A cell containing 0.60 g of said manganese oxide was discharged at a current of 12 mA. The discharge curve is shown in FIG. 7. The cell was found to have a capacity of about 218 mAh/g, to a 1 V cut-off voltage.

Figure 8:
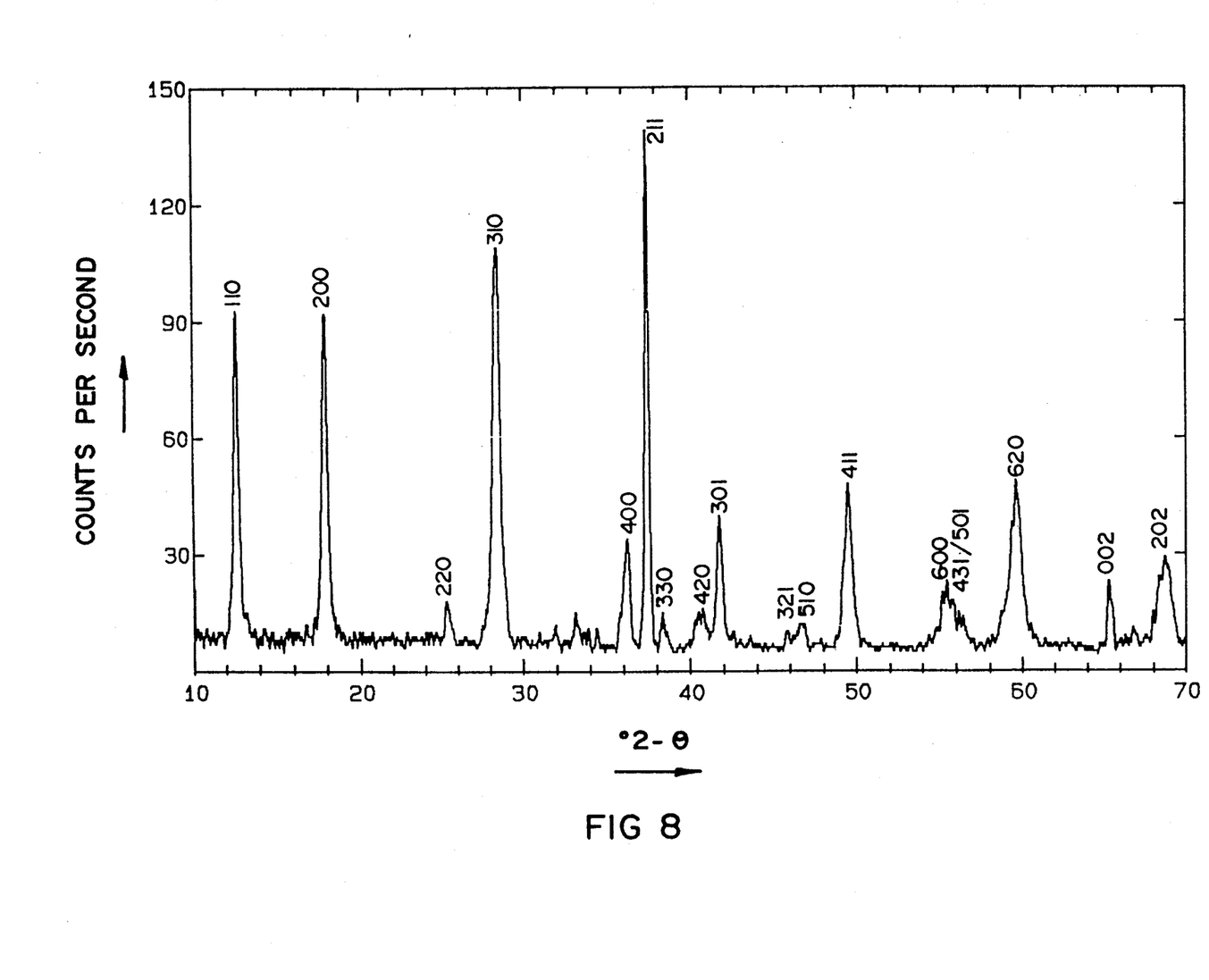
FIG. 8 shows a powder X-ray diffraction pattern of the hydrogen manganese oxide whose pattern is shown in FIG. 1, after discharge in a zinc cell of the type whose discharge curve is shown in FIG. 7.

The X-ray diffraction pattern of the cathode after discharge to 1 V as shown in FIG. 7 is shown in FIG. 8. It is to be noted again that the hollandite-type framework is retained during discharge of this cell but that an expansion of the lattice occurs on discharge due to the incorporation of $NH_4$ and/or Zn and/or H cations therein, as is evident from the shift of the peaks to lower 2$\Theta$ values. The tetragonal unit cell of the discharged cathode was determined to have lattice constants $a=b=9.908$ Å and $c=2.854$ Å.

EXAMPLE 6

Figure 9:
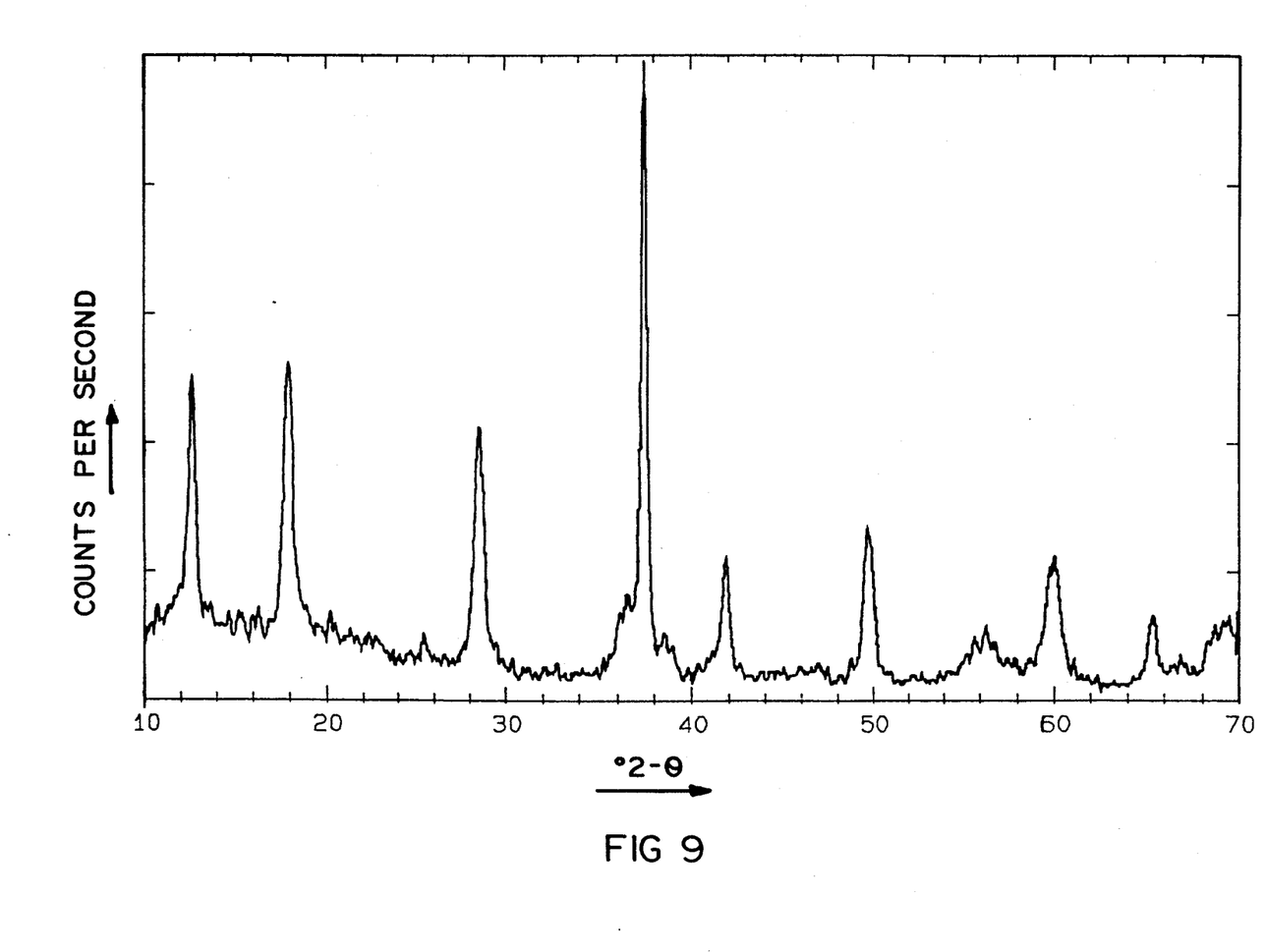
FIG. 9 shows a powder X-ray diffraction pattern of a lithium hydrogen manganese oxide compound according to the present invention.

The hydrogen manganese oxide product of Example 1 was reacted with $LiOH.H_2O$ in a 1:2 molar ratio of said product:$LiOH.H_2O$ at 300° C. for 16 hours in air after thorough mixing. The resulting lithium hydrogen manganese oxide product, in which lithium is partially ion exchanged for hydrogen in the product of Example 1, was washed with distilled water to remove residual $LiOH.H_2O$ and the product was reheated to 300° C. in air for a further 16 hours. The Li:Mn ionic ratio in the product, was determined to be 0.25:1.00. A powder X-ray diffraction pattern of the reheated product is shown in FIG. 9. The lattice constants of the reheated product were determined to be $a=b=9.844$ Å and $c = 2.85$ Å, which reflect a significant expansion of the unit cell of the reheated product compared with the hydrogen manganese oxide product of Example 1.

EXAMPLE 7

Figure 10:
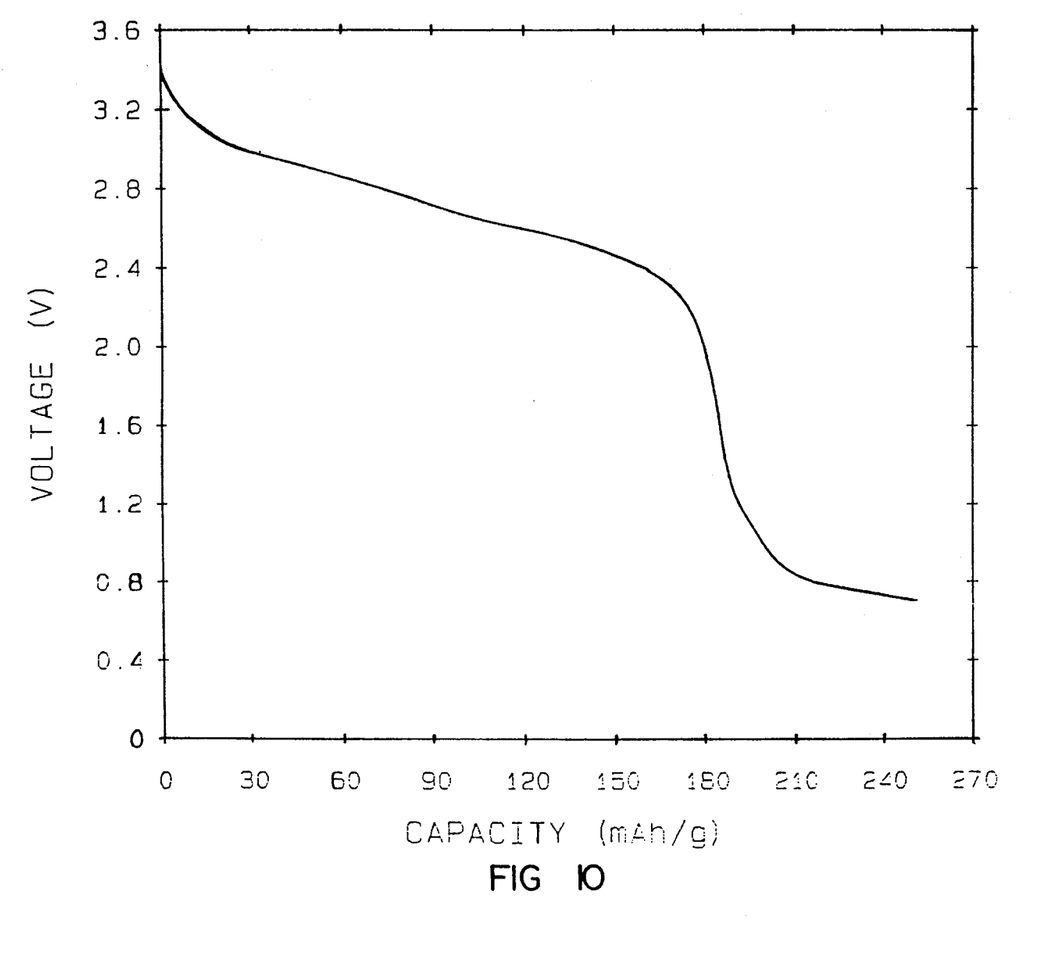
FIG. 10 shows a plot of voltage (V) against capacity (mA-hr/g) for the discharge curve of a lithium cell employing, as its cathode, the lithium hydrogen manganese oxide whose pattern is shown in FIG. 9.
Figure 11:
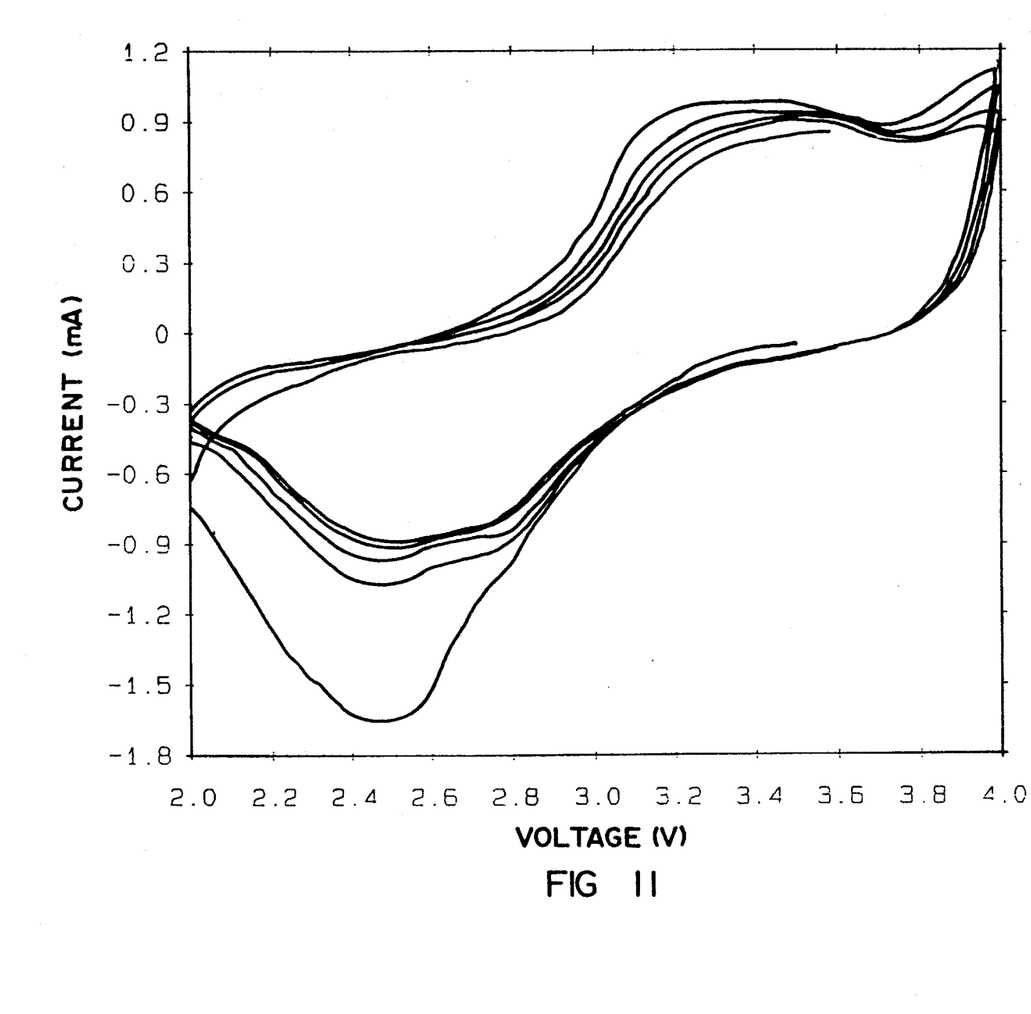
FIG. 11 shows a cyclic voltammogram plot of current (mA) against voltage (V) for the cell and cathode whose discharge curve is shown in FIG. 10.

The reheated product of Example 6 was employed as a cathode in a cell similar to that of Example 3. This cell was discharged at 20° C. at a current of 200 μA. The cell was determined to have a capacity of about 180 mA-hr/g, based on the mass of active cathode material, to a cut-off voltage of 2 V, and a capacity of about 200 mA/g, to a cut-off voltage of 1 V. The discharge curve of this cell is shown in FIG. 10. A cyclic voltammogram of a similar cell, cycled between voltage limits of 4.0 V and 2.0 V, is shown in FIG. 11 and demonstrates that the cell can operate reversibly, confirming that the reheated product of Example 6 has utility as a cathode in rechargeable cells.

Figure 12:
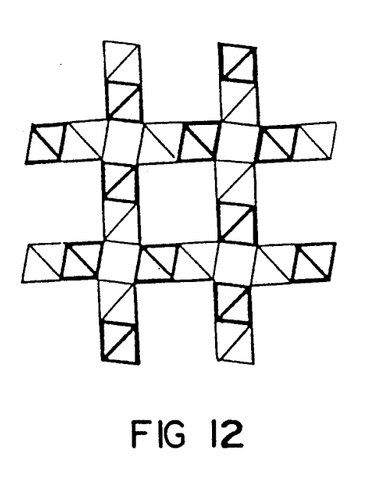
FIG. 12 shows a schematic diagram of the hollandite structure of the hydrogen manganese oxide whose pattern is shown in FIG. 1.

With regard to FIG. 12, the hollandite-type structure shown is that of the manganese oxide framework of the hydrogen manganese oxide compound of the present invention.

The cathodes of the present invention thus have utility in both primary and secondary (rechargeable) cells and batteries thereof.

It is conceivable that up to 25% of the manganese cations in the framework having the hollandite-type structure can be replaced by other metal cations, eg other transition metal cations, without materially affecting the utility of the compound of the present invention, and the invention accordingly extends to such compounds. It should also be noted that the Applicant has found the hydrogen manganese oxide compounds and the lithium hydrogen manganese oxide compounds of the present invention to be essentially single phase compounds, typically with no more than 5% other phases, usually less than 1% other phases, by mass.

We claim:

1. A hydrogen manganese oxide compound in which there are manganese cations and oxygen anions arranged in a framework having a hollandite structure defining channels, the only metal cations in the channels other than manganese cations being lithium cations, the ionic ratio of lithium cations:manganese cations being at most 0.05:1.00, and the ionic ratio of hydrogen cations:manganese cations being at least 0.01:1.00.

2. A compound as claimed in claim 1, in which said ionic ratio of lithium cations:manganese cations is at most 0.03:1.00.

3. A compound as claimed in claim 1, in which the ionic ratio of oxygen anions to manganese cations is 1.74:1.00–2.00:1.00.

4. A compound as claimed in claim 2, in which the ionic ratio of oxygen anions to manganese cations is 1.75:1.00–2.00:1.00.

5. An electrochemical cell which comprises an anode whose active anode material is selected from the group consisting of zinc, zinc alloys, mixtures of said zinc-containing anode materials, lithium, lithium alloys, lithium-containing compounds and mixtures of said lithium-containing anode materials, a cathode and an electrolyte whereby the anode is electrochemically coupled to the cathode, the cathode having as its active cathode material, a hydrogen manganese oxide compound as claimed in claim 1.

6. A cell as claimed in claim 5, which has a zinc-containing active anode material, the electrolyte being an aqueous room temperature electrolyte selected from solutions of $NH_4Cl$, $ZnCl_2$, KOH and mixtures thereof, the cathode being one in which the ionic ratio of hydrogen cations:manganese cations is at least 0.10:1.00.

7. A cell as claimed in claim 5, which has a lithium-containing active anode material, the electrolyte being a room temperature electrolyte selected from $LiClO_4$, $LiAsF_6$, $LiBF_4$ and mixtures thereof, dissolved in an organic solvent, the cathode being one in which the ionic ratio of hydrogen cations:manganese cations is at most 0.10:1.00.

8. A method of making a hydrogen manganese oxide compound as claimed in claim 1, the method comprising treating a suitable lithium manganese oxide compound with an acid at a temperature of 40°–100° C., to leach $Li_2O$ therefrom, to leave a residue comprising said hydrogen manganese oxide compound.

9. A method as claimed in claim 8, in which the lithium manganese oxide is $Li_2MnO_3$.

10. A method as claimed in claim 8, in which the acid is a mineral acid, the leaching taking place at 70°–100° C.

11. A method as claimed in claim 10, in which the acid is $H_2SO_4$ at a concentration of 0.5–10 Molar.

12. A lithium manganese compound of formula $H_{2x-z}Li_zMnO_{2+x}$ in which $0.005 < x \leq 0.3$ and $0 < z \leq 2x$, having manganese cations and oxygen anions arranged in a stable hollandite structure having channels containing no cations other than lithium cations, hydrogen cations and manganese cations.

13. A method of synthesizing a lithium manganese oxide compound of formula $H_{2x-z}Li_zMnO_{2+x}$ in which $0.005 < x \leq 0.3$ and $0 < z \leq 2x$, having manganese cations and oxygen anions arranged in a stable hollandite structure having channels containing no cations other than lithium cations, hydrogen cations and manganese cations, which method comprises reacting a hydrogen manganese oxide compound as claimed in claim 1 with a lithium compound, in an oxygen-containing atmosphere at a temperature of 250°–400° C., until the lithium compound has been consumed by the heating and by reaction thereof with said hydrogen manganese oxide compound.

14. An electrochemical cell which comprises an anode whose active anode material is selected from the group consisting of lithium, lithium alloys, lithium-containing compounds and mixtures of said lithium-containing anode-materials, a cathode and an electrolyte whereby the anode is electrochemically coupled to the cathode, the cathode having as its active cathode material, a compound as claimed in claim 12.

15. A hydrogen manganese oxide compound in which there are manganese cations and oxygen anions arranged in a framework having a hollandite structure defining channels, the only metal cations in the channels other than manganese cations being lithium cations, the ionic ratio of lithium cations: manganese cations being at most 0.05:1.00, and the ionic ratio of hydrogen cations:manganese cations being at least 0.01:1.00, made in accordance with the method as claimed in claim 8.

16. A lithium manganese oxide compound of formula $H_{2x-z}Li_zMnO_{2+x}$ in which $0.005 < x \leq 0.03$ and $0 < z \leq 2x$, having manganese cations and oxygen anions arranged in a stable hollandite structure having channels containing no cations other than lithium cations, hydrogen cations and manganese cations, made in accordance with the method as claimed in claim 13.

* * * * *